United States Patent [19]

Ngoc Le et al.

[11] Patent Number: 4,689,312

[45] Date of Patent: Aug. 25, 1987

[54] PROCEDURE FOR REGENERATING PLATINUM CONTAINING ZEOLITE CATALYST COMPOSITIONS

[75] Inventors: Quang Ngoc Le, Cherry Hill; Stephen J. McCarthy, Thorofare; Kenneth M. Mitchell, Mt. Laurel, all of N.J.

[73] Assignee: Mobil Oil Corporation, New York, N.Y.

[21] Appl. No.: 843,549

[22] Filed: Mar. 25, 1986

[51] Int. Cl.[4] .................. B01J 29/38; B01J 23/96; B01J 23/94; C10G 47/12

[52] U.S. Cl. .................... 502/38; 208/89; 208/111; 502/41; 502/53; 585/739

[58] Field of Search ............. 502/38, 41, 50, 52, 502/53; 208/111

[56] References Cited

U.S. PATENT DOCUMENTS

| | | | |
|---|---|---|---|
| 2,338,881 | 1/1944 | Thomas | 502/53 |
| 3,308,069 | 5/1967 | Wadunger et al. | 208/111 |
| 3,357,915 | 12/1967 | Young | 208/111 |
| 3,412,013 | 11/1968 | Bowles | 502/53 |
| 3,849,293 | 11/1974 | Ward | 208/111 |
| 3,943,051 | 3/1976 | Ward | 208/111 |
| 4,107,031 | 8/1978 | Ward | 208/111 |
| 4,139,433 | 2/1979 | Ward | 208/111 |
| 4,518,485 | 5/1985 | La Pierre et al. | 208/111 |

OTHER PUBLICATIONS

Reichle, A. D. and L. A. Pine, J. W. Ward, R. C. Hansford, "Hydrocracking Catalyst Rejuvenated", *The Oil and Gas Journal*, p. 137 et seq. (Jul. 29, 1974).
Reichle, A. D. et al., "New Rejuvenation Techniques Extend Unicracking-JHC Catalyst Life", presented at the NPRA Annual Meeting, Mar. 31-Apr. 2, 1974, Miami, Florida, p. 21.

*Primary Examiner*—P. E. Konopka
*Attorney, Agent, or Firm*—Alexander J. McKillop; Michael G. Gilman; Marina V. Schneller

[57] ABSTRACT

An improved regeneration procedure is described for restoring the hydrogen chemisorption of aged platinum containing zeolite catalyst compositions. The process includes subjecting th catalyst to reactivation, followed by oxygen regeneration. After regeneration, in accordance with the invention, a platinum containing zeolite catalyst composition has a platinum dispersion, illustrated by $H_2$ chemisorption, equivalent to fresh catalyst.

17 Claims, No Drawings

PROCEDURE FOR REGENERATING PLATINUM CONTAINING ZEOLITE CATALYST COMPOSITIONS

FIELD OF THE INVENTION

The invention is directed to an improved regeneration procedure for restoring hydrogen chemisorption of aged zeolite catalyst compositions containing hydrogenation/dehydrogenation metal(s). The procedure comprises subjecting the aged catalyst to high temperature/pressure hydrogen reactivation, followed by low temperature/pressure oxygen burning. The result is that the regenerated catalyst composition contains a very high hydrogenation metal dispersion, as measured by high $H_2$ chemisorption, comparable to the fresh catalyst.

BACKGROUND OF THE INVENTION

Molecular sieves, referred to as zeolites, have found application in various hydrocarbon conversion processes, including isomerization and hydrocracking. For use in the hydrocarbon conversion processes, the catalyst compositions containing the zeolites often contain a hydrogenation/dehydrogenation component. A valuable hydrogenation/dehydrogenation component is platinum. During use in catalytic hydrocarbon conversion processes, zeolites containing the platinum hydrogenation/dehydrogenation component undergo gradual deactivation.

Deactivation of the platinum-containing zeolite catalyst compositions is attributable in part to coke deposition and in part to migration and agglomeration of the noble metal component. Coke deactivation is readily reversible by conventional oxidative regeneration, but such regeneration has little if any effect in redispersing the agglomerated noble metal, and may in fact bring about further agglomeration. Parenthetically, the extent of agglomeration can be reflected in X-ray diffraction patterns of the catalyst composition; as the platinum agglomeration increases and becomes more aggravated, the X-ray diffraction pattern reflects the increase in size of the agglomerates.

The prior art has recognized the problem of agglomeration of the Group VIII noble metal, supported on the zeolite during deactivation, and during oxygen regeneration. In recognizing the problem, the prior art has presented several alternatives for attempting to regenerate such catalysts. Exemplary of the art, directed to the problem of reactivating noble metal zeolite Y containing hydrocracking catalysts include U.S. Pat. No. 4,107,031; U.S. Pat. No. 4,139,433; U.S. Pat. No. 3,943,051; Reichle et al., "Hydrocracking Catalyst Rejuvenated", The Oil and Gas Journal, p. 137 et seq. (July 29, 1974) and Reichle et al., "New Rejuvenation Techniques extend Unicracking-JHC Catalyst Life", presented at the NPRA Annual Meeting, Spring 1974; U.S. Pat. Nos. 3,849,293 and 3,692,692. The United States patents, referred herein, providing alternatives for reactivating Group VIII noble metal containing zeolite catalyst compositions rely upon the use of ammonia treatment.

SUMMARY OF THE INVENTION

Oxygen regeneration of platinum-containing zeolites usually results in very poor platinum dispersion as measured by hydrogen chemisorption. Low platinum dispersion in the zeolite-containing catalyst composition translates into poor catalyst performance. Such platinum-containing zeolite catalyst compositions characterized by low platinum dispersion in the catalyst composition, have exhibited poor performance in isomerization/dewaxing processes and in moderate pressure hydrocracking processes.

The process of the invention which includes hydrogen reactivation followed by oxygen regeneration provides a catalyst with high platinum dispersion comparable to fresh catalyst. The process of the invention is characterized by the advantage that it avoids the use of corrosive gases, such as chlorine, hydrogen chloride, and the like for rejuvenating to redisperse the agglomerated platinum metal on the zeolite in the catalyst composition. The improved regeneration procedure will improve process economics, in those processes requiring platinum-containing zeolite catalyst compositions, by extending the ultimate life of the expensive platinum-containing zeolite catalyst composition.

DETAILED DESCRIPTION OF THE INVENTION

Catalyst compositions comprising zeolites are used in various hydrocarbon conversions, serving as the basis for raw petroleum refining. Those hydrocarbon conversions comprise passing a hydrocarbon feedstock over a zeolite containing catalyst under hydrocarbon conversion conditions including elevated temperature and pressures. The feedstocks, having boiling points greater than about 500° F. up to 1500° F. are of complex molecular make-up, containing aromatic and paraffinic fractions, as well as constituents which include nitrogen (N), sulfur (S) and oxygen (O) atoms. Under hydrocarbon conversion conditions, nitrogen, sulfur and oxygen derivatives can be produced and do contaminate the catalyst, with potential adverse affect on the zeolite containing composition. Coking caused by complete breakdown of the aromatic and paraffinics also causes deactivation and aging of those catalysts compositions.

The hydrocarbon conversion conditions themselves can adversely affect the catalyst, as, compared to synthetic organic reaction conditions, these hydrocarbon conversion conditions are severe. Sintering of the catalyst composition can occur under these severe conditions. Agglomeration of metallic components of the catalyst composition can occur under these conditions, and as a result of sintering. Hydrocarbon conversion conditions include temperatures ranging from 100° C. to 760° C.; pressures of 0.1 to 60 atmospheres, weight hourly space velocities from 0.08 to 1000 and hydrogen flow rate of 500 to 10,000 SCF/bbl. The exact hydrocarbon conversion conditions will vary depending on the exact nature of the conversion sought. Thus, hydrocarbon conversion condition for hydrocracking, at moderate pressure, will include pressures of about 400 lb-3000 psig, and preferably 800-2000 psig; temperatures of about 700°-850° F. and liquid hourly space velocities (LHSV) ranging from 0.5-10 and preferably an LHSV of 1 to 31; the hydrogen gas, measured for standard cubic feed per barrel of feed (SCF/bbl), will range from 1000 to 20,000 and preferably from 2000-10,000. By comparison, hydrocarbon conversion condition for isomerization dewaxing of wax containing feedstocks will include a temperature of from about 260° C. to about 482° C., a pressure of from 200 psig to about 3000 psig, an LHSV of from about 0.2 to about 20; the wax content of such feedstocks is attributable to straight long chains ($C_8$ +) paraffins or only slightly branched long chain ($C_8$ +) paraffins. By isomerization-dewaxing processes, these two sources of wax are isomerized to branched and/or to highly branched paraffins of $C_8$ +.

Many of the developments in hydrocarbon conversion processes have been realized since the development of synthetic zeolites, which are peculiarly suitable to hydrocarbon conversion conditions. The zeolites can be classed as small pore, medium pore and large pore zeolites. The zeolite containing catalyst compositions which may be treated in accordance with the invention include those which contain the zeolites exemplified by the group including zeolite Y, zeolite A, zeolite L, zeolite Beta, ZSM-20 and other zeolites characterized by a constraint index in the approximate range of about 1 to 12. Zeolites having a constraint index within the approximate range of about 1 to about 12 include, but are not limited to, ZSM-5, ZSM-11, ZSM-12, ZSM-23, ZSM-35, and ZSM-48.

As indicated above, when the zeolite containing catalyst compositions are employed in hydrocarbon hydroconversion conditions, in other words, conversions requiring hydrogen, they also contain a metal which is a hydrogenation/dehydrogenation component. Group VIII metals, and particularly the platinum group metals, are prime candidates for hydrogenation/dehydrogenation component(s). The hydrogenation/dehydrogenation component can be ion-exchanged, deposited or dispersed into the catalyst composition by techniques known to the art, which are exemplified by U.S. Pat. Nos. 3,140,251, 3,140,252 and 3,140,253, each being incorporated by reference herein. The catalyst composition will comprise 0.1 to 30 weight percent of the hydrogenation component; but, practically the catalyst composition will generally contain 0.1 to 10 weight percent of the catalyst composition. The catalyst will contain the zeolite in an amount ranging from about 10 to 90 weight percent, with the remainder being a matrix or binder material. The matrix or binder material can be alumina, silica, silica-alumina, and other substantially inert silicon or aluminum containing materials known to the art.

In addition to coking and contamination of the zeolite containing catalyst by nitrogen, sulfur and oxygen derivatives, agglomeration of the hydrogen-dehydrogenation metal, such as platinum, occurs during the hydrocarbon conversions. Such agglomeration results in decreased dispersion of the hydrogenation/dehydrogenation metal, compared to the dispersion of that metal in the fresh catalyst composition. High hydrogenation/dehydrogenation metal dispersion as measured by hydrogenation chemisorption allows the catalyst to exhibit very good catalyst performance, resulting in decreased conversion temperatures, for example in dewaxing and in higher distillate yields in hydrocracking.

In accordance with the invention, regeneration of the catalyst including the zeolite and the hydrogenation/dehydrogenation component comprises contacting the aged catalyst, exhibiting hydrogen chemisorption lower than that of the fresh catalyst, with hydrogen at high temperature and elevated pressure and subsequently contacting the hydrogen treated composition with oxygen at low temperature and elevated pressure.

In the hydrogen contact stage the catalyst will be subjected to hydrogen at a flow rate of 200 SCF/hr./cu.ft. catalyst to 1000 SCF/hr./cu.ft. of catalyst at pressures ranging from about 14.7 psig to about 3000 psig; preferably, the 300 and 2000 psig. Temperatures in the hydrogen contact stage will range from 600° to 2000° F.; preferably that temperature will be 800° to 950° F.

In the oxygen contact stage, the hydrogen contacted catalyst is contacted with the oxygen alone, or oxygen admixed with an inert gas such as nitrogen; when admixed with, e.g. nitrogen the oxygen is about 0.5 to 7 Vol % in $N_2$. Total oxygen flow rate can range from 500 to 2000 SCF/bbl under pressures which can range from 14.7 to 2000 psig. Preferably, the pressure in this stage is 100 psig to 1000 psig. The temperature in the oxygen contact stage will range from 600° to 1000° F. And preferably, the temperature in the oxygen contact stage is 700° to 900° F. For example, oxygen cascade can be conducted at an oxygen rate of 200 SCF/hr./cu.ft. catalyst to about 500 SCF/hr./cu.ft. catalyst; at a temperature of about 600° to about 1000° F.; at a presssure of about 14.7 to about 2000 psig. The process of the invention consisting essentially of, or consisting of, the high temperature/pressure hydrogen reactivation followed by low temperature/pressure oxygen burning obviates the use of corrosive gases, such as chlorine and hydrochloric acid for rejuvenating and redispersing agglomerated hydrogenation/dehydrogenation metal, such as platinum, in the catalyst composition. The process of the invention comprising those two stages results in regeneration of a platinum containing zeolite Beta containing catalyst composition which exhibits platinum dispersion, as measured by hydrogen chemisorption, far higher than that obtained by conventional oxygen burning which results in relatively lower platinum dispersion and poor catalyst performances.

Another advantage of this improved procedure is that hydrogen reactivation step removes significant amounts of coke. Thus, the sequential oxygen burning can be carried out at lower temperature and shorter burning time. In addition, the hydrogen reactivation will reduce steaming generated during oxygen regeneration.

In one embodiment of the process, the hydrogen and oxygen gases are cascaded, in sequence described above and under conditions described above, over a catalyst composition used and aged in hydrotreating and then over the spent zeolite catalyst composition containing the agglomerated hydrogenation metal. This cascading, by which we mean continuous flow of the gas over the two catalysts without intervening interruption of gas flow, produces results in terms of platinum dispersion, measured by hydrogen chemisorption as well as by X-ray diffraction superior to those results obtained in the absence of the hydrotreating catalyst, such as a nickel-tungsten containing catalyst, as can be seen by the results reported in the experiments below in conjunction with Table II. In catalytic hydrotreating, the hydrotreating catalyst will include one or more metals of Group VIII and Group VI; exemplary of metals used as the metal in hydrotreating are cobalt, nickel, molybdenum and tungsten, alone or in combination. In the experiments below, the spent and/or aged hydrotreating catalyst contained nickel and tungsten. The hydrotreating catalyst contains such metals ion-exchanged, dispersed or deposited on a matrix and/or on a zeolite. In the experiments reported below the metal component(s) of the hydrotreating catalyst were contained in a catalyst composition which included both a matrix, which is a substantially inert refractory in organic oxide, often referred to as a binder, and a zeolite. Both the matrix and the zeolite can be those reported above. In the hydrotreating catalyst compositions the metal component can comprise 0.1 to 30 weight percent of the catalyst; the zeolite may comprise 0 to 90 weight percent of the catalyst composition; and the matrix can comprise the remainder, 70 to 99.9 weight percent of the composition. Such catalysts under used in hydrotreating under conditions summarized below:

|  | Hydrotreating Conditions |
| --- | --- |
| Pressure, broad, psig | 200-3000 |
| Pressure, preferred | 400-2500 |
| Temperature, broad, °C. | 176-371 |
| Temperature, preferred, °C. | 204-316 |
| LHSV,* broad | 0.1-10 |
| LHSV, preferred | 0.2-3 |
| $H_2$ gas, SCF/bbl, broad | 500-20,000 |
| $H_2$ gas, SCF/bbl, preferred | 500-3000 |

Feeds hydrocracked by the platinum zeolite beta containing catalyst are usually subjected to hydrotreating prior to the hydrocracking stage. Thus, it will be possible, in accordance with the invention to subject both the aged spent hydrotreating catalyst as well as the hydrocracking catalyst to regeneration. The hydrotreating catalyst will be contaminated with sulfur, oxygen, carbon and/or nitrogen after use in the hydrotreating conditions.

EXPERIMENTS

Unsteamed catalyst, comprising 0.6 weight percent platinum on 50% zeolite beta: 50% $Al_2O_3$ was used to process hydrotreated Arab Light VGO for two (2) months. After those two months the aged catalyst was retrieved and analyzed; analysis showed coke and sulfur contamination as indicated in Table 1 below.

Then the aged catalyst aforedescribed was used in the regeneration process of the invention. The aged platinum-zeolite beta-alumina composition was placed in a reactor. An aged NiW-zeolite beta catalyst, typical of compositions used in hydrotreating-hydrocracking was placed upstream the aged platinum-zeolite beta-alumina catalyst in the same reactor.

Regeneration, in accordance with the invention, included two stages: in the first stage hydrogen reactivation was conducted at 1000 psig, 950° F. for 24 hours. Then oxygen regeneration was conducted with 1% $O_2$ (in $N_2$) at 600 psig in a temperature range of 650°-800° F. A clean-up burning step at 850° F. with 7% $O_2$ (in $N_2$) was conducted for 12 hours. The catalyst properties (normalized to fresh catalyst basis) after each sequence are shown in Table 1.

TABLE 1

Catalyst Properties: Unsteamed Pt Zeolite Beta[a]
0.6 wt % Pt on 50% Beta/50% $Al_2O_3$

|  | Fresh | Aged | After $H_2$ Reactivation | $H_2$ React/ $O_2$ Regn. |
| --- | --- | --- | --- | --- |
| Coke, wt % | — | 31.4 | 15.9 | 0.05 |
| Sulfur, wt % | — | 0.16 | 0.03 | 0.05 |
| Nitrogen, ppm W | — | — | 267 | 12 |
| Density, cc/g |  |  |  |  |
| Particle | 2.801 | 2.948 | 2.667 | — |
| Bulk | 0.881 | 1.111 | — | — |
| Pore Volume, cc/g | 0.777 | 0.561 | — | 0.779 |
| Pore Diam., A | 78 | 125 | 88 | 88 |
| Surface Area, m²/g | 399 | 179 | 277 | 354 |

TABLE 1-continued

Catalyst Properties: Unsteamed Pt Zeolite Beta[a]
0.6 wt % Pt on 50% Beta/50% $Al_2O_3$

|  | Fresh | Aged | After $H_2$ Reactivation | $H_2$ React/ $O_2$ Regn. |
| --- | --- | --- | --- | --- |
| Pt Dispersion,[b] | 58 | — | — | 67 |

[a]Normalized to fresh catalyst basis
[b]Measured by $H_2$ chemisorption

The results show that after $H_2$ reactivation/$O_2$ regeneration, the catalyst had a Pt dispersion of 67% (as measured by hydrogen chemisorption) compared to 58% dispersion for the fresh catalyst. The hydrogen reactivation removed about 50% of the coke and 80% of the sulfur from the aged catalyst.

It was postulated that a possible explanation of the results was due to the presence of the aged NiW catalyst in the reactor which resulted in by-products of regeneration, such as $SO_x$, $NH_3$, and the like, which affected and/or protected the downstream platinum/zeolite beta composition during regeneration.

Later additional data showed that during oxidative regeneration the presence of an aged NiW catalyst (specifically, the aged NiW catalyst was upstream of the platinum zeolite beta composition) restored the hydrogen chemisorption of the Pt zeolite Beta catalyst. Table II shows the properties of the regenerated Pt zeolite Beta catalyst with and without the aged NiW catalyst after $H_2$ reactivation $O_2$ regeneration. X-ray diffraction results indicated that without the upstream NiW catalyst the oxidative regeneration caused significantly more Pt particles to agglomerate. Cascade regeneration of NiW catalyst/Pt catalyst resulted in 0.12 wt % Pt with particle sizes greater than 50 Angstroms; by comparison 0.20 wt % Pt on the catalyst was in the form of particles greater than 50Å when regeneration was conducted in the absence of the NiW catalyst.

TABLE II

Effect of NiW Catalyst During Pt Zeolite Beta Regeneration

|  | Fresh[a] | $H_2$ Reactivation/$O_2$ Regeneration | |
| --- | --- | --- | --- |
|  |  | Without NiW | With NiW |
| Pt Dispersion, %[b] | 58 | — | 67 |
| X-Ray Diffraction[c] | 0.02 | 0.20 | 0.12 |

[a]0.6 wt % Pt on 50% Beta/50% $Al_2O_3$ (SMO-445)
[b]Measured by $H_2$ chemisorption.
[c]Fraction (wt %) of Pt with particle sizes greater than 50 Å.

What is claimed is:

1. A process for decreasing the size of agglomerates of platinum group metal, contained in a catalyst composition comprising the platinum group metal and a zeolite which has been used in a catalytic hydrocarbon conversion during which hydrocarbon conversion the platinum group metal has become agglomerated, comprising two cascading stages, A followed by B wherein A and B are defined below as, A. cascading hydrogen over compositions (a) and (b), seriatim, wherein the composition (a) is hydrotreating catalyst containing 0.1 to 30 weight percent of a metal selected from the group consisting of nickel, cobalt, tungsten, molybdem and mixtures thereof, wherein said composition (a) has been contaminated by carbon alone or admixed with at least one element selected from the group consisting of sulfur, oxygen, and nitrogen in a hydrotreating process prior to use in A, and composition (b) is the catalyst containing the agglomerates of a platinum group metal metal, wherein hydrogen is cascaded at a rate of about 300 SCF/hr./cu.ft. catalyst to about 500 SCF/hr./cu.ft. catalyst; at a temperature ranging from about 600° to about 2000° F.; and at a pressure from about 14.7 to about 3000 psig; and B. then cascading oxygen over the hydrogen contacted composition (a) and then over the hydrogen contacted composition (b) without intervening interruption of gas flow, at an oxygen rate catalyst; at a temperature of about 600° to about 1000° F.; at a pressure of about 14.7 to about 2000 psig, whereby the size of said agglomerates is decreased.

2. The process of claim 1, wherein the temperature in the hydrogen cascade stage ranges from about 800° to about 950° F. and the pressure ranges from about 300 to about 2000 psig.

3. The process of claim 1, wherein the temperature of the oxygen contact stage ranges from about 700° to about 900° F. and the pressure ranges from about 100 to about 1000 psig.

4. The process of claim 2, wherein the temperature of the oxygen contact stage ranges from about 700° to about 900° F. and the pressure ranges from about 100 to about 1000 psig.

5. The process of claim 1, wherein the platinum group metal is platinum.

6. The process of claim 4, wherein said platinum group metal is platinum.

7. The process of claim 1, wherein the metal in the hydrotreating catalyst is an admixture of nickel and tungsten.

8. The process of claim 2, wherein the metal in the hydrotreating catalyst (a) is an admixture of nickel and tungsten.

9. The process of claim 7, wherein the platinum group metal is platinum.

10. The process of claim 8, wherein the platinum group metal is platinum.

11. The process of claim 1, wherein the composition (b) includes zeolite Beta.

12. The process of claim 4, wherein the composition (b) includes zeolite Beta.

13. The process of claim 11, wherein composition (a) includes zeolite Beta.

14. The process of claim 12, wherein composition (a) includes zeolite Beta.

15. The process of claim 7, wherein the hydrotreating catalyst (a) includes zeolite Beta.

16. The process of claim 9, wherein the catalyst composition (b) comprises zeolite Beta.

17. The process of claim 15, wherein the catalyst composition (b) comprises zeolite Beta.

* * * * *